(12) United States Patent
Gurevich et al.

(10) Patent No.: US 12,050,961 B2
(45) Date of Patent: Jul. 30, 2024

(54) METHODS AND APPARATUS FOR CONFIGURING REDUCED DECODE RANGES FOR BARCODE SCANNERS

(71) Applicant: ZEBRA TECHNOLOGIES CORPORATION, Lincolnshire, IL (US)

(72) Inventors: Vladimir Gurevich, Great Neck, NY (US); Mehaboob Kumbalakkuzhiyil, Holbrook, NY (US); Andrew Cornell, East Northport, NY (US); Christopher W. Brock, Manorville, NY (US); David Tsi Shi, Setauket, NY (US)

(73) Assignee: Zebra Technologies Corporation, Lincolnshire, IL (US)

( * ) Notice: Subject to any disclaimer, the term of this patent is extended or adjusted under 35 U.S.C. 154(b) by 239 days.

(21) Appl. No.: 17/829,066

(22) Filed: May 31, 2022

(65) Prior Publication Data

US 2023/0385578 A1 Nov. 30, 2023

(51) Int. Cl.
  *G06K 7/10* (2006.01)
  *G06K 7/14* (2006.01)

(52) U.S. Cl.
  CPC .................. *G06K 7/1413* (2013.01)

(58) Field of Classification Search
  CPC ........... G06K 7/10801; G06K 7/10722; G06K 7/10821

USPC ............. 235/462.01, 462.11, 462.22, 462.41
See application file for complete search history.

(56) References Cited

U.S. PATENT DOCUMENTS

| | | | |
|---|---|---|---|
| 2003/0222147 A1* | 12/2003 | Havens ................... | G06K 7/109 235/462.45 |
| 2004/0020990 A1* | 2/2004 | Havens ............... | G06K 7/10861 235/472.01 |
| 2011/0220719 A1* | 9/2011 | Ogawa ............... | G06K 7/10861 235/462.12 |
| 2012/0153022 A1* | 6/2012 | Havens ............... | G06K 7/10841 235/455 |

* cited by examiner

*Primary Examiner* — Paultep Savusdiphol
(74) *Attorney, Agent, or Firm* — Yuri Astvatsaturov (57) ABSTRACT

Methods and apparatus for configuring reduced decode ranges for barcode scanners are disclosed. An example method includes determining a closest focus distance of a plurality of focus distances at which a barcode placed at a furthest limit of a reduced decode range can be successfully decoded; determining a furthest focus distance of the plurality of focus distances at which the barcode placed at a closest limit of the reduced decode range can be successfully decoded; determining a subset of the plurality of focus distances that consists of the closest focus distance, the furthest focus distance, and focus distances between the closest focus distance and the farthest focus distance; and configuring the barcode scanner to only use the subset of focus distances during subsequent attempts to decode barcodes.

20 Claims, 6 Drawing Sheets

METHODS AND APPARATUS FOR CONFIGURING REDUCED DECODE RANGES FOR BARCODE SCANNERS

BACKGROUND

Typically, barcodes to be scanned and decoded will be different distances from a barcode scanner. Accordingly, barcode scanner are typically configured to capture different images while focused at different focus distances until a barcode is successfully decoded from the image data for a captured image.

SUMMARY

In an embodiment, the present invention is a method of configuring a reduced decode range for a barcode scanner having a plurality of discrete focus distances including: determining a closest focus distance of the plurality of focus distances at which a barcode placed at a furthest limit of the reduced decode range can be successfully decoded; determining a furthest focus distance of the plurality of focus distances at which the barcode placed at a closest limit of the reduced decode range can be successfully decoded; determining a subset of the plurality of focus distances that consists of the closest focus distance, the furthest focus distance, and focus distances between the closest focus distance and the farthest focus distance; and configuring the barcode scanner to only use the subset of focus distances during subsequent attempts to decode barcodes.

In a variation of this embodiment, determining the closest focus distance includes: (i) prompting a person to place a calibration barcode at the furthest limit, wherein the calibration barcode represents a densest barcode that the barcode scanner is intended to decode at the furthest limit; (ii) setting a current focus distance of the barcode scanner to a closest of the plurality of focus distances; and (iii) for each of the plurality of focus distances until the calibration barcode is successfully decoded: focusing the barcode scanner at the current focus distance; capturing, using an image sensor of the barcode scanner, image data representing an image of an environment that includes the calibration barcode while the optical assembly is focused at the current focus distance; attempting to decode, using a barcode decoder, the calibration barcode from the image data; when the calibration barcode is not successfully decoded, setting the current focus distance to the next further focus distance; and when the calibration barcode is successfully decoded, setting the closest focus distance to the current focus distance.

In a variation of this embodiment, determining the furthest focus distance includes: (i) prompting a person to place the calibration barcode at the closest limit; (ii) setting a current focus distance of the barcode scanner to a furthest of the plurality of focus distances; and (iii) for each of the plurality of focus distances until the calibration barcode is successfully decoded: focusing the barcode scanner at the current focus distance; capturing, using an image sensor of the barcode scanner, image data representing an image of an environment that includes the calibration barcode while the optical assembly is focused at the current focus distance; attempting to decode, using a barcode decoder, the calibration barcode from the image data; when the calibration barcode is not successfully decoded, setting the current focus distance to the next closer focus distance; and when the calibration barcode is successfully decoded, setting the furthest focus distance to the current focus distance.

In a variation of this embodiment, determining the closest focus distance includes: determining a second subset of the focus distances at which the barcode, when placed at the furthest limit, can be successfully decoded; and determining the closest focus distance to be the focus distance of the second subset of focus distances that is closest to the barcode scanner.

In a variation of this embodiment, determining the furthest focus distance includes: determining a third subset of the plurality of focus distances at which the barcode, when placed at the closest limit, can be successfully decoded; and determining the furthest focus distance to be the focus distance of the third subset of focus distances that is furthest from the barcode scanner.

In a variation of this embodiment, determining the second subset of focus distances includes: (i) prompting a person to place a calibration barcode at the furthest limit, wherein the calibration barcode represents a densest barcode that the barcode scanner is intended to decode at the furthest limit; and (ii) for each of the plurality of focus distances: focusing an optical assembly of the barcode scanner at the focus distance; capturing, using an image sensor of the barcode scanner, image data representing an image of an environment that includes the calibration barcode while the optical assembly is focused at the focus distance; attempting to decode, using a barcode decoder, the calibration barcode from the image data; and when the calibration barcode is successfully decoded, adding the focus distance to the second subset of focus distances.

In a variation of this embodiment, determining the subset of focus distances includes determining a smallest subset of the plurality of focus distances that enables the barcode scanner to successfully decode barcodes having an anticipated density and located between the furthest limit and the closest limit.

In a variation of this embodiment, the method further comprises, for each of the subset of focus distances until a barcode is successfully decoded: (i) capturing, using an image sensor of the barcode scanner, image data representing an image of an environment of the barcode scanner; (ii) attempting, using a barcode decoder, to decode a barcode from the image data; and (iii) when a barcode is successfully decoded: stop attempting to decode a barcode; determining a payload of the decoded barcode; and providing the payload to a computing system.

In another embodiment, the present invention is a barcode scanner including one or more processors, and non-transitory computer-readable storage storing instructions. The instructions, when executed by the one or more processors, causes the barcode scanner to: determine a closest focus distance of a plurality of discrete focus distances of the barcode scanner at which a barcode placed at a furthest limit from the barcode scanner can be successfully decoded; determine a furthest focus distance of the plurality of focus distances at which the barcode placed at a closest limit from the barcode scanner can be successfully decoded; determine a subset of the plurality of focus distances that consists of the closest focus distance, the furthest focus distance, and focus distances between the closest focus distance and the furthest focus distance; and configure the barcode scanner to only use the subset of focus distances during subsequent attempts to decode barcodes.

In a variation of this embodiment, the instructions, when executed by the one or more processors, cause the system to determine the closest focus distance by: (i) prompting a person to place a calibration barcode at the furthest limit, wherein the calibration barcode represents a densest barcode that the barcode scanner is intended to decode at the furthest limit; (ii) setting a current focus distance of the barcode scanner to a closest of the plurality of focus distances; and (iii) for each of the plurality of focus distances until the calibration barcode is successfully decoded: focusing the barcode scanner at the current focus distance; capturing, using an image sensor of the barcode scanner, image data representing an image of an environment that includes the calibration barcode while the optical assembly is focused at the current focus distance; attempting to decode, using a barcode decoder, the calibration barcode from the image data; when the calibration barcode is not successfully decoded, setting the current focus distance to the next further focus distance; and when the calibration barcode is successfully decoded, setting the closest focus distance to the current focus distance.

In a variation of this embodiment, the instructions, when executed by the one or more processors, cause the system to determine the furthest focus distance by: (i) prompting a person to place a calibration barcode at the closest limit; (ii) setting a current focus distance of the barcode scanner to a furthest of the plurality of focus distances; and (iii) for each of the plurality of focus distances until the calibration barcode is successfully decoded: focusing the barcode scanner at the current focus distance; capturing, using an image sensor of the barcode scanner, image data representing an image of an environment that includes the calibration barcode while the optical assembly is focused at the current focus distance; attempting to decode, using a barcode decoder, the calibration barcode from the image data; when the calibration barcode is not successfully decoded, setting the current focus distance to the next closer focus distance; and when the calibration barcode is successfully decoded, setting the furthest focus distance to the current focus distance.

In a variation of this embodiment, the instructions, when executed by the one or more processors, cause the system to determine the closest focus distance by: determining a second subset of the plurality of focus distances at which the barcode, when placed at the first distance from the barcode scanner, can be successfully decoded; and determining the closest focus distance to be the focus distance of the second subset of focus distances that is closest to the barcode scanner.

In a variation of this embodiment, the instructions, when executed by the one or more processors, cause the system to determine the furthest focus distance by: determining a third subset of the plurality of focus distances at which the barcode, when placed at the second distance from the barcode scanner, can be successfully decoded; and determining the furthest focus distance to be the focus distance of the third subset of focus distances that is furthest from the barcode scanner.

In a variation of this embodiment, the barcode scanner further comprises an image sensor, an optical assembly, and a barcode decoder; and the instructions, when executed by the one or more processors, cause the system to determine the second subset of focus distances by: (i) directing a person to place a calibration barcode at the first distance, wherein the calibration barcode represents a densest barcode that the barcode is intended to decode at the first position; and (ii) for each of the plurality of focus distances: focusing the optical assembly of the barcode scanner at the focus distance; capturing, using the image sensor, image data representing an image of an environment including the calibration barcode while the optical assembly is focused at the focus distance; attempting to decode, using the barcode decoder, the calibration barcode from the image data; and when the calibration barcode is successfully decoded, adding the focus distance to the second subset of focus distances.

In a variation of this embodiment, the instructions, when executed by the one or more processors, cause the system to determine the subset of focus distances by determining a smallest subset of the plurality of focus distances that enables the barcode scanner to successfully decode barcodes having an anticipated density and located between the closest limit and the furthest limit.

In a variation of this embodiment, the barcode scanner further comprises an image sensor, an optical assembly, and a barcode decoder; and the instructions, when executed by the one or more processors, cause the system to, for each of the subset of focus distances until a barcode is successfully decoded: (i) capture, using the image sensor, image data representing an image of an environment of the barcode scanner; (ii) attempt, using the barcode decoder, to decode a barcode from the image data; and (iii) when a barcode is successfully decoded: stop attempting to decode a barcode; determining a payload of the decoded barcode; and providing the payload to a computing system.

In yet another embodiment, the present invention is a non-transitory, computer-readable storage media storing instructions that, when executed by one or more processors, cause a barcode scanner to: determine a closest focus distance of a plurality of discrete focus distances of the barcode scanner at which a barcode placed at a furthest limit from the barcode scanner can be successfully decoded; determine a furthest focus distance of the plurality of focus distances at which the barcode placed at a closest limit from the barcode scanner can be successfully decoded; determine a subset of the plurality of focus distances that consists of the closest focus distance, the furthest focus distance, and focus distances between the closest focus distance and the furthest focus distance; and configure the barcode scanner to only use the subset of focus distances during subsequent attempts to decode barcodes.

In a variation of this embodiment, the instructions, when executed by the one or more processors, cause the barcode scanner to determine the closest focus distance by: (i) prompting a person to place a calibration barcode at the furthest limit, wherein the calibration barcode represents a densest barcode that the barcode scanner is intended to decode at the furthest limit; (ii) setting a current focus distance of the barcode scanner to a closest of the plurality of focus distances; and (iii) for each of the plurality of focus distances until the calibration barcode is successfully decoded: focusing the barcode scanner at the current focus distance; capturing, using an image sensor of the barcode scanner, image data representing an image of an environment that includes the calibration barcode while the optical assembly is focused at the current focus distance; attempting to decode, using a barcode decoder, the calibration barcode from the image data; when the calibration barcode is not successfully decoded, setting the current focus distance to the next further focus distance; and when the calibration barcode is successfully decoded, setting the closest focus distance to the current focus distance.

In a variation of this embodiment, the instructions, when executed by the one or more processors, cause the barcode scanner to determine the furthest focus distance by: (i) prompting a person to place a calibration barcode at the closest limit; (ii) setting a current focus distance of the barcode scanner to a furthest of the plurality of focus distances; and (iii) for each of the plurality of focus distances until the calibration barcode is successfully decoded: focusing the barcode scanner at the current focus distance; capturing, using an image sensor of the barcode scanner, image data representing an image of an environment that includes the calibration barcode while the optical assembly is focused at the current focus distance; attempting to decode, using a barcode decoder, the calibration barcode from the image data; when the calibration barcode is not successfully decoded, setting the current focus distance to the next closer focus distance; and when the calibration barcode is successfully decoded, setting the furthest focus distance to the current focus distance.

In a variation of this embodiment, the instructions, when executed by the one or more processors, cause the barcode scanner to, for each of the subset of focus distances until a barcode is successfully decoded: (i) capturing, using an image sensor of the barcode scanner, image data representing an image of an environment of the barcode scanner; (ii) attempting, using a barcode decoder, to decode a barcode from the image data; and (iii) when a barcode is successfully decoded: stop attempting to decode a barcode; determining a payload of the decoded barcode; and providing the payload to a computing system.

BRIEF DESCRIPTION OF THE DRAWINGS

The accompanying figures, where like reference numerals refer to identical or functionally similar elements throughout the separate views, together with the detailed description below, are incorporated in and form part of the specification, and serve to further illustrate embodiments of concepts that include the claimed invention, and explain various principles and advantages of those embodiments.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

The apparatus and method components have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

DETAILED DESCRIPTION

The range of focus distances at which a barcode scanner captures images of and attempts to decode barcodes is referred to herein as the "decode range" of the barcode scanner. That is, a barcode scanner's decode range represents a range of distances from the barcode scanner (e.g., from an exit window of the barcode scanner or surface of an image sensor) in which the barcode scanner is expected to be able to successfully locate and decode presented barcodes of an anticipated barcode density.

As technology increases the decode range of a barcode scanner, the maximum time needed to locate and decode a particular barcode may also increase. For example, the barcode scanner may need to try focusing at an increasing number and range of focus distances to successfully decode a particular barcode. This increase in maximum decode time may cause user frustration and/or limit the performance of automated systems that rely on barcode scanning. However, under some circumstances, only a portion of a barcode scanner's maximum decode range will actually be used. For example, even though a barcode scanner is capable of focusing from two (2) inches to thirty (30) inches, the barcode scanner may be used in an application where barcodes will only be between twelve (12) and twenty (20) inches from the barcode scanner. Thus, in such circumstances, disclosed barcode scanners can be configured with a reduced decode range and, thus, the maximum time it takes the barcode scanner to locate and decode such barcodes can be reduced. For example, a barcode scanner may have a total of five (5) discrete focus distances ranging from two (2) inches to thirty (30) inches, but may only need to try three (3) of those focus distances when barcodes are expected to only be located between twelve (12) and twenty (20) inches from the barcode scanner.

Reference will now be made in detail to non-limiting examples, some of which are illustrated in the accompanying drawings.

Figure 1:
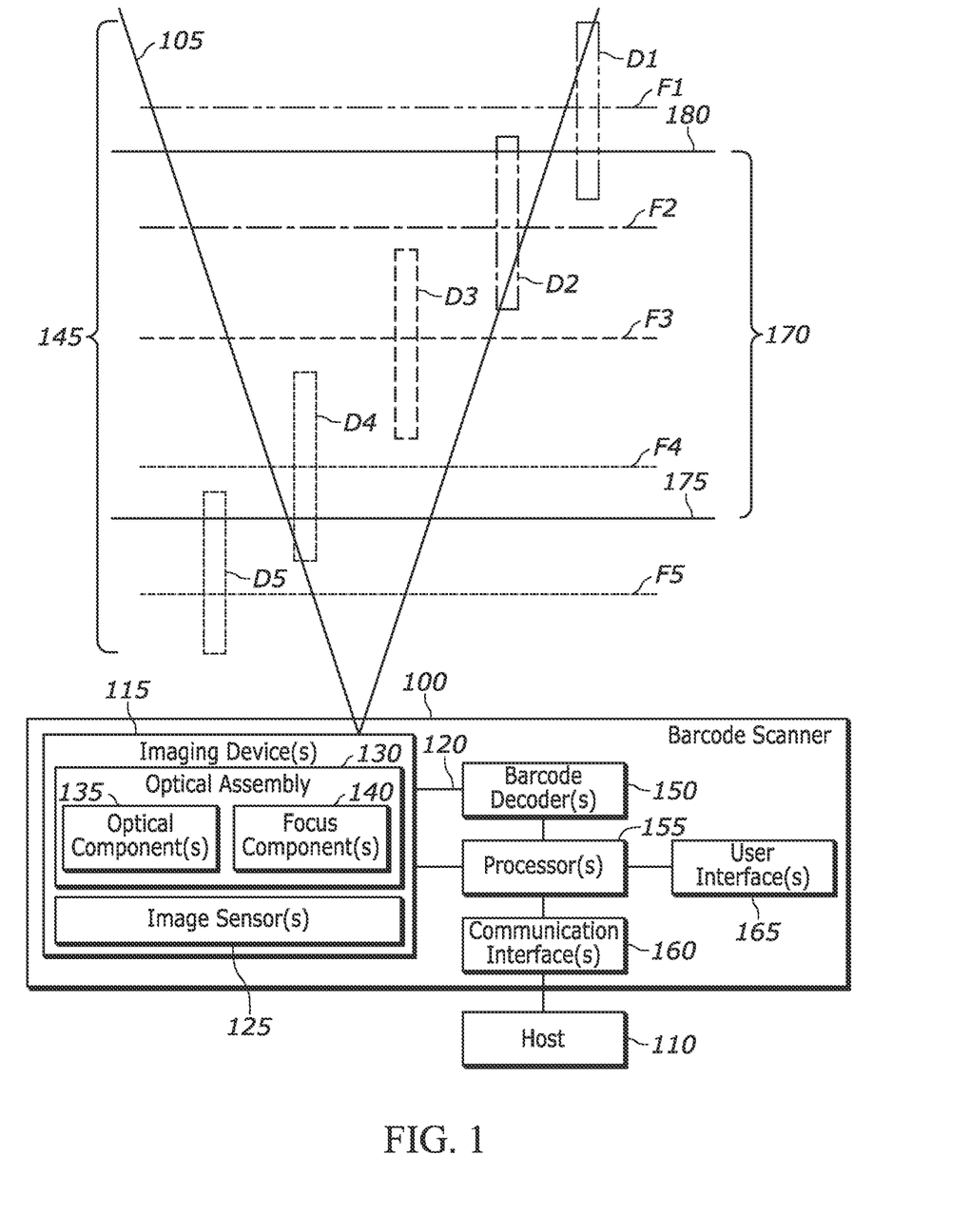
FIG. 1 is a block diagram of an example barcode scanner, in accordance with embodiments of the disclosure.

FIG. 1 illustrates an example barcode scanner 100 for capturing images of, and decoding barcodes appearing in a field of view (FOV) 105 of the barcode scanner 100, and providing payload(s) thereof to a host computing device or system 110. For clarity of explanation, the following description refers to barcodes. However, it should be understood that disclosed examples can be used with other types of indicia, such as direct product markings (DPMs), etc. The host 110 may be a point-of-sale (POS) station, a point-of-transaction station, an inventory management system, etc.

The barcode scanner 100 may be, for example, a handheld scanner that may operate in a handheld and/or handsfree mode, a bioptic scanner, a machine vision system, a slot scanner, or the like that are configured to decode barcodes and provide the payload of the decoded barcodes to the host 110. The barcode scanner 100 may also be, for example, a general-purpose computing device (e.g., a computer, a laptop, a mobile device such as a mobile phone, a tablet, etc.), a headset or other wearable device (e.g., an augmented reality (AR) headset, etc.), or any other type of computing device or system having a communication interface and a camera for capturing images, and configurable to process such images for decoding barcodes. While the following describes the barcode scanner 100 as decoding barcodes, additionally and/or alternatively, the barcode scanner 100 could provide image data for captured images to another device or system, such as the host 110, for decoding. An example logic circuit 600 that may be used to implement the barcode scanner 100 is discussed below in connection with FIG. 6.

The example barcode scanner 100 includes any number and/or type(s) of example imaging devices 115 configured to capture digital images 120. The imaging device(s) 115 capture, using one or more image sensors 125 having a plurality of photosensitive elements, image data representing the images 120 of an environment in which the barcode scanner 100 is operating that falls within the FOV 105 of the imaging device(s) 115. Example image data includes data representing the outputs of the plurality of photosensitive elements, that is, the pixels of the image sensor(s) 125.

The example imaging device 115 includes an optical assembly 130 to form images of the environment falling within the FOV 105 of the imaging device 115 on a surface of the image sensor(s) 125. The optical assembly 130 may include any number and/or type(s) of optical elements and/or components 135 including, for example, one or more lenses, filters, focus motors, apertures, lens holder, liquid lenses, or any other components and/or optical elements.

The example optical assembly 130 also includes any number and/or type(s) of focus components 140 that can be controlled by a focus controller (not shown for clarity of illustration) to focus the optical assembly 130 at different focus distances. Example focus components 140 include, for example, one or more movable lenses that may be moved by one or more motors under the control of the focus controller. In some examples, the focus components 140 are selectively controllable by the focus controller to focus the imaging device 115 quickly and precisely at any one of a set of fixed, discrete focus distances corresponding to respective ones of a set of fixed, discrete focus positions of the optical assembly 130. In the illustrated example of FIG. 1, the imaging device 115 has a set of five (5) example focus distances {F1, F2, F3, F4, F5}, although a barcode scanner according to this disclosure may have other numbers of focus distances. Moreover, while an example spacing of the focus distances F1, F2, F3, F4, F5 is shown in FIG. 1, focus distances may be spaced apart by other amounts, including unequally spaced apart.

The optical assembly 130 has, for each focus distance F1, F2, F3, F4, F5, a respective depth-of-focus D1, D2, D3, D4, D5. Each depth-of-focus (DoF) D1, D2, D3, D4, D5 represents a range of distances from the barcode scanner 100 within which a barcode of an anticipated barcode density can be successfully decoded while the optical assembly 130 is focused at the corresponding focus distance F1, F2, F3, F4, F5. While for simplicity the DoFs D1, D2, D3, D4, D5 shown in FIG. 1 are of generally equal size, they may be of unequal size. Generally, the DoFs D1, D2, D3, D4, D5 will vary depending on the particular selection and arrangement of optical component(s) 135 and/or focus component(s) 140 used to implement the optical assembly 130. However, regardless of their sizes, the optical assembly 130 may be configured such that the DoFs D1, D2, D3, D4, D5 overlap to some extent such that they collectively cover a maximum decode range 145 of the barcode scanner 100. Such an arrangement of discrete focus distances F1, F2, F3, F4, F5, and DoFs D1, D2, D3, D4, D5 enable the barcode scanner 100 to quickly image and decode barcodes anywhere in the maximum decode range 145 without the complexity of autofocus. Moreover, the use of the discrete focus distances F1, F2, F3, F4, F5 enables the barcode scanner 100 to more quickly capture images across the entire maximum range 145 without waiting for the processing of images to perform autofocus and without needing fine control of the focus components 140.

While not shown for clarity of illustration, the imaging device 115 may include (i) an aiming pattern generator configured to provide an illuminated aiming pattern to assist a user in directing the imaging device 115 toward a barcode of interest, and/or (ii) an illumination generator to emit light in the FOV 105 to, for example, facilitate autofocus and/or improve the quality of image data captured by the image sensor(s) 125.

The example barcode scanner 100 includes any number and/or type(s) of example barcode decoders 150 configured to locate and decode barcodes from image data representing the images 120 captured by the image sensor(s) 125 to determine the payload(s) of the barcode(s). Example barcode decoders 150 include a programmable processor, programmable controller, graphics processing unit (GPU), digital signal processor (DSP), etc. capable of executing instructions for, for example, locating and decoding barcodes, or other indicia. Additionally and/or alternatively, the barcode decoder(s) 150 may include one or more logic circuits capable of, for example, locating and decoding barcodes, or other indicia, without executing software or instructions.

The example barcode scanner 100 includes one or more example processors 155 to generally control the barcode scanner 100; provide payloads decoded by the barcode decoder(s) 150 to, for example, the host 110 via any number and/or type(s) of communication interface(s) 160; execute an operating system; provide one or more user interfaces 165; respond to user inputs received via the communication interface(s) 160 and/or the user interface(s) 165; execute one or more applications on behalf of a user; etc. In some examples, some of the focus components 140 (e.g., the focus controller) are implemented by the processor(s) 155. In some examples, the processor(s) 155 and the barcode decoder(s) 150 are implemented by the same device. Example processors 155 include a programmable processor, programmable controller, GPU, DSP, etc. capable of executing instructions to, for example, implement operations of the example methods described herein. Additionally and/or alternatively, the processor(s) 155 may include one or more logic circuits capable of, for example, implementing operations of the example methods described herein without executing software or instructions.

Figure 2:
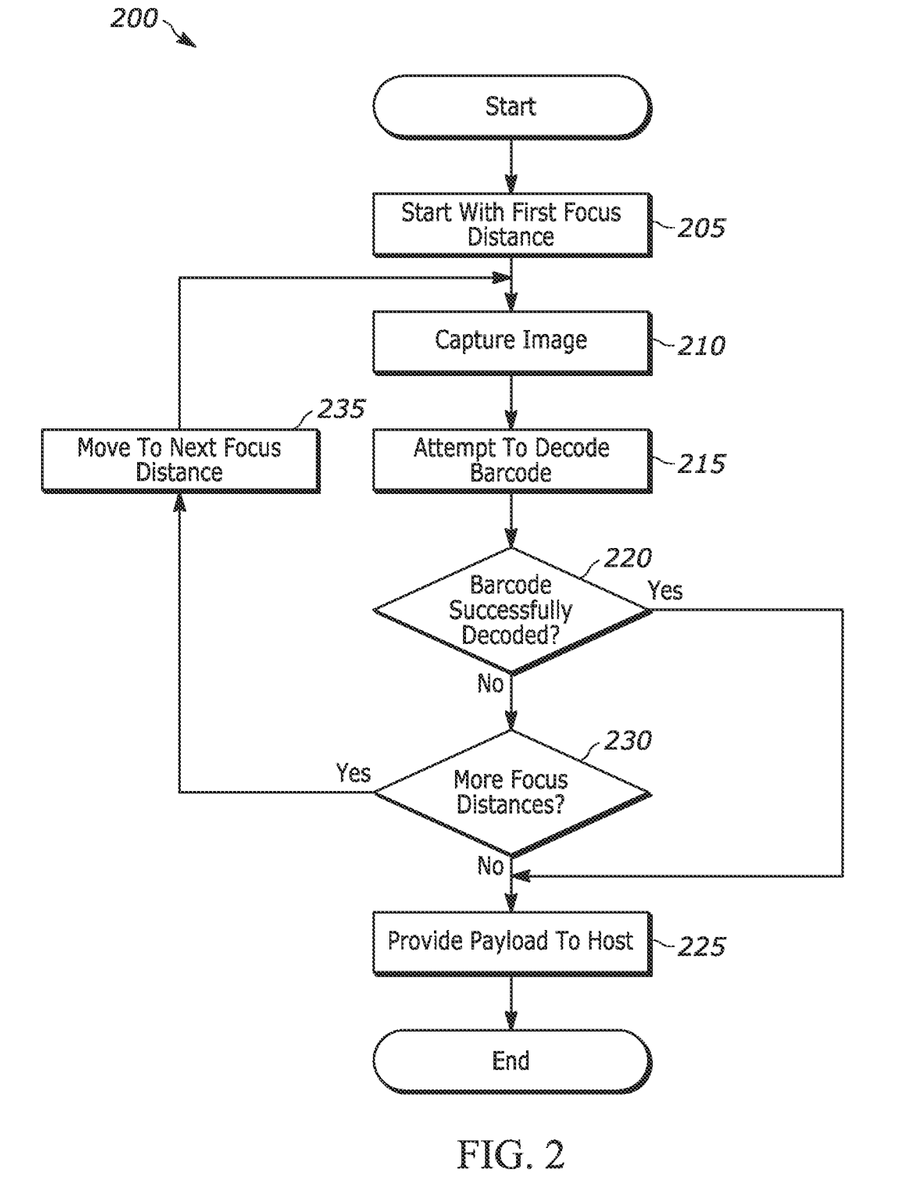
FIG. 2 is a flowchart representative of an example method, hardware logic, machine-readable instructions, or software for locating and decoding a barcode in a field of view, in accordance with embodiments of the disclosure.

FIG. 2 is a flowchart 200 representative of an example process or method that may be implemented or carried out by the processor(s) 155 and/or, more generally, the barcode scanner 100 of FIG. 1 to locate and decode a barcode appearing in the FOV 105 of the barcode scanner 100. In some examples, the flowchart 200 is carried out when the barcode scanner 100 detects an object in the FOV 105, when a user activates a trigger of the barcode scanner 100, etc. Any or all of the blocks of FIG. 2 may be an executable program or portion(s) of an executable program embodied in software and/or machine-readable instructions stored on a non-transitory, machine-readable storage medium for execution by one or more processors, such as the processor(s) 155. Additionally and/or alternatively, any or all of the blocks of FIG. 2 may be implemented by one or more hardware circuits structured to perform the corresponding operation(s) without executing software or instructions.

The flowchart 200 of FIG. 2 begins at block 205 with the processor(s) 155 controlling the focus components 140 to focus the imaging device 115 at a first focus distance (e.g., the focus distance F1). The processor(s) 155 control the image sensor 125 to capture image data representing a first image 120 (block 210), and control the barcode decoder 150 to attempt to decode a barcode from the image data (block 215). If one or more barcodes are successfully decoded (block 220), the processor(s) 155 provide the payload of the decoded barcode(s) to the host 110 (block 225), and control exits from the example flowchart 200.

If a barcode is not successfully decoded (block 220), and if there are more focus distances to try (block 230), control proceeds to block 235 where the processor(s) 155 control the focus components 140 to focus the imaging device 115 at the next focus distance (e.g., the focus distance F2) (block 235), and control returns to block 210 to capture image data representing another image 120.

If there are no more focus distances to try (block 230), control exits from the example flowchart 200.

While control exits from the example flowchart 200 once a barcode is successfully decoded, additionally and/or alternatively, image data may be captured at each focus distance, and processed to attempt to decode a barcode while focused at each focus distance.

When, for a particular application or usage, the full decode range 145 of the barcode scanner 100 is not needed, then the disclosed example barcode scanner 100 can be configured to use or implement a reduced barcode range 170 to increase the rate at which the barcode scanner 100 can locate and decode barcodes. For example, the barcode scanner 100 may be capable of a maximum decode range 145 of two (2) inches to thirty (30) inches using the example set of discrete focus distances {F1, F2, F3, F4, F5}, but may be used in an application where only a reduced decode range 170 of twelve (12) to twenty (20) inches is needed. Accordingly, the disclosed barcode scanner 100 can be configured to use only a subset {F2, F3, F4} of the discrete focus distances {F1, F2, F3, F4, F5}, thus, speeding up the rate at which the barcode scanner 100 can image and decode barcodes within the reduced decode range 170 of twelve (12) to twenty (20) inches. When the reduced decode range 170 is used or implemented, the example flowchart 200 only captures images and attempts to decode barcodes at the subset of focus distances {F3, F4, F5} associated with the reduced decode range 170.

In some examples, the subset of focus distances used to implement a reduced decode range is selected or identified to be the smallest subset of focus distances that enables a barcode anywhere in the reduced decode range to be successfully imaged and decoded. The closest focus distance of the subset can be selected by considering a barcode of an anticipated barcode density at the closest limit 175 of the reduced decode range 170, and determining the furthest away focus distance at which the barcode can be successfully imaged and decoded. That is, by determining the furthest focus distance at which the barcode at the closest limit 174 can be successfully decoded. In the illustrated example, a barcode at the closest limit 175 can be successfully decoded using either one of the focus distances F4 and F5 because their DoFs D4 and D5 overlap at the closest limit 175. Thus, in disclosed examples, the focus distance F4 is selected as the closest focus distance of the subset.

Similarly, the furthest focus distance of the subset can be selected by considering a barcode of an anticipated barcode density at the furthest limit 180 of the reduced decode range 170, and determining the closest focus distance at which the barcode can be successfully imaged and decoded. That is, by determining the closest focus distance at which the barcode at the furthest limit 180 can be successfully decoded. In the illustrated example, a barcode at the furthest limit 180 can be successfully decoded using either one of the focus distances F1 and F2 because their DoFs D1 and D2 overlap at the furthest limit 180. Thus, in disclosed examples, the focus distance F2 is selected as the furthest focus distance for the subset.

The subset of focus distances for the reduced decode range 170 can, thus, be determined to include or consist of these two focus distances F2 and F4, and the focus distances therebetween. Accordingly, for the illustrated example, the subset of focus distances {F2, F3, F4} is used to capture images of and decode barcodes for the reduced decode range 170.

Figure 3:
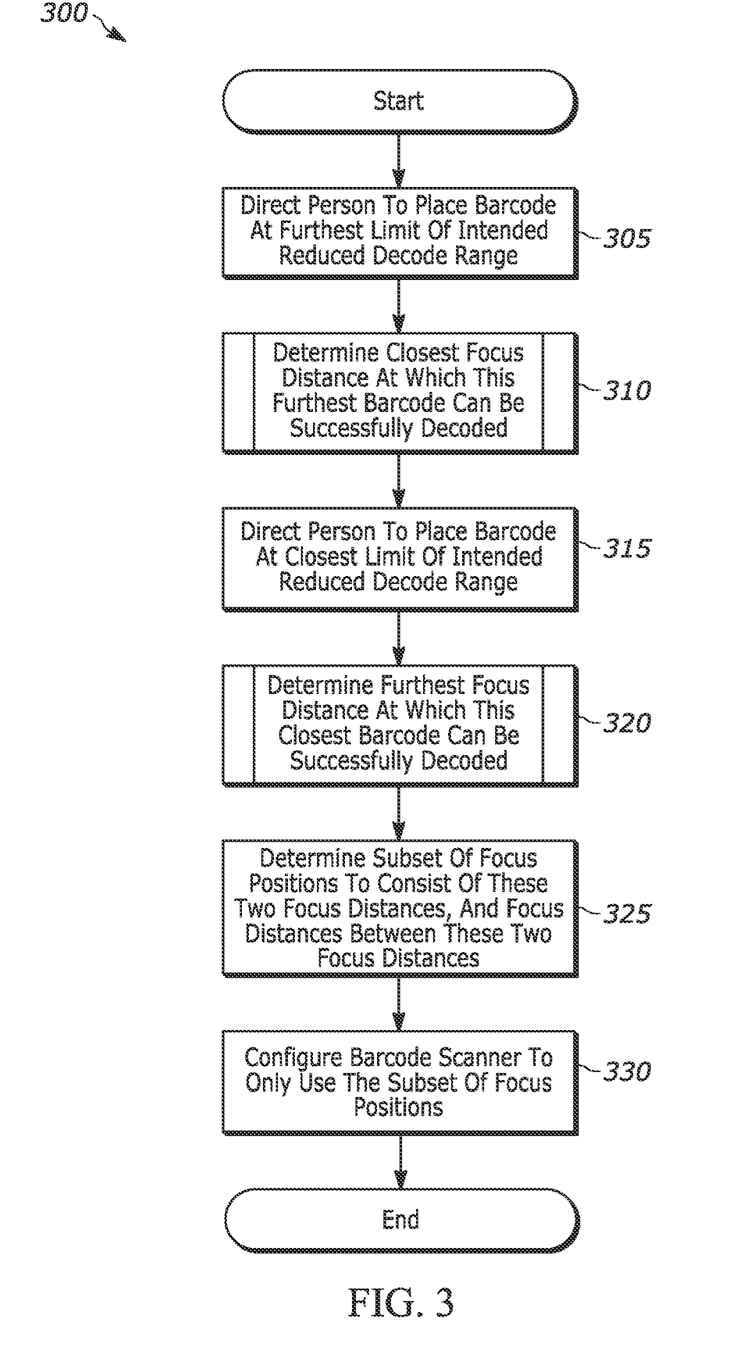
FIG. 3 is a flowchart representative of an example method, hardware logic, machine-readable instructions, or software for configuring a reduced decode range for a barcode scanner, in accordance with embodiments of the disclosure.

FIG. 3 is a flowchart 300 of an example process or method that may be implemented or carried out to determine the subset of focus distances that can be used to implement a reduced decode range for a particular usage or application of a barcode scanner. The flowchart 300 may be carried out when, for example, a person directs the barcode scanner to adapt to or learn a reduced decode range. Any or all of the blocks of FIG. 3 may be an executable program or portion(s) of an executable program embodied in software and/or machine-readable instructions stored on a non-transitory, machine-readable storage medium for execution by one or more processors such as the processor(s) 155. Additionally and/or alternatively, any or all of the blocks of FIG. 3 may be implemented by one or more hardware circuits structured to perform the corresponding operation(s) without executing software or instructions.

The flowchart 300 of FIG. 3 begins at block 305 with the processor(s) 155 directing (e.g., via the user interface(s) 165) a person to place a barcode of an anticipated maximum barcode density at the furthest limit 180 of a reduced decode range 170 (block 305). The processor(s) 155 determine the closest focus distance at which the barcode at the furthest limit 180 can be successfully decoded by, for example, carrying out the example flowchart 400 of FIG. 4 (block 310).

The processor(s) 155 direct (e.g., via the user interface(s) 165) a person to place the barcode at the closest limit 175 of a reduced decode range 170 (block 315). The processor(s) 155 determine the furthest focus distance at which the barcode at the closest limit 175 can be successfully decoded by, for example, carrying out the example flowchart 500 of FIG. 5 (block 320).

The processor(s) 155 determine the subset of focus distances for the reduced decode range 170 to include or consist of these two focus distances, and the focus distances therebetween (block 325), and configures the barcode scanner to image and decode barcodes using the subset of focus distances (block 330). Control then exits from the example flowchart 300.

Figure 4:
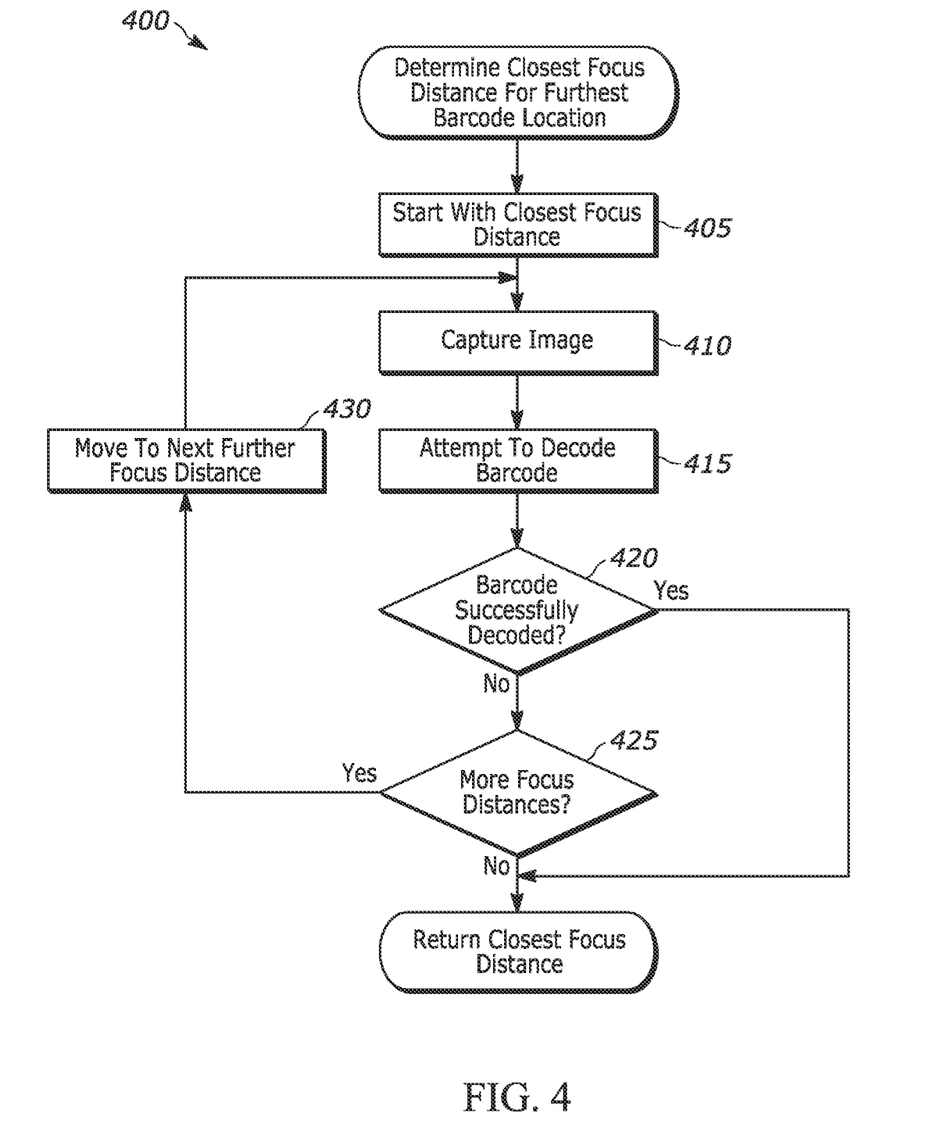
FIG. 4 is a flowchart representative of an example method, hardware logic, machine-readable instructions, or software for determining a closest focus position at which a barcode at a furthest limit can be decoded, in accordance with embodiments of the disclosure.

FIG. 4 is a flowchart 400 representative of an example process or method that may be implemented or carried out by the processor(s) 155 and/or, more generally, the barcode scanner 100 of FIG. 1 to determine a closest focus distance at which a barcode of an anticipated maximum barcode density at a furthest limit of a decode range can be successfully imaged and decoded. Any or all of the blocks of FIG. 4 may be an executable program or portion(s) of an executable program embodied in software and/or machine-readable instructions stored on a non-transitory, machine-readable storage medium for execution by one or more processors, such as the processor(s) 155. Additionally and/or alternatively, any or all of the blocks of FIG. 4 may be implemented by one or more hardware circuits structured to perform the corresponding operation(s) without executing software or instructions.

The flowchart 400 of FIG. 4 begins at block 405 with the processor(s) 155 controlling the focus components 140 to focus the imaging device 115 at its closest focus distance (e.g., the focus distance F1). The processor(s) 155 control the image sensor(s) 125 to capture image data representing a first image 120 (block 410), and control the barcode decoder 150 to attempt to decode a barcode from the image data (block 415). If one or more barcodes are successfully decoded (block 420), control exits from the example flowchart 400, returning this focus distance as the closest focus distance for the subset.

If a barcode is not successfully decoded (block 420), and if there are more focus distances to try (block 425), control proceeds to block 430 where the processor(s) 155 control the focus components 140 to focus the imaging device 115 at the next further focus distance (e.g., the focus distance F2) (block 430), and control returns to block 410 to capture image data representing another image 120.

If there are no more focus distances to try (block 425), control exits from the example flowchart 400.

Figure 5:
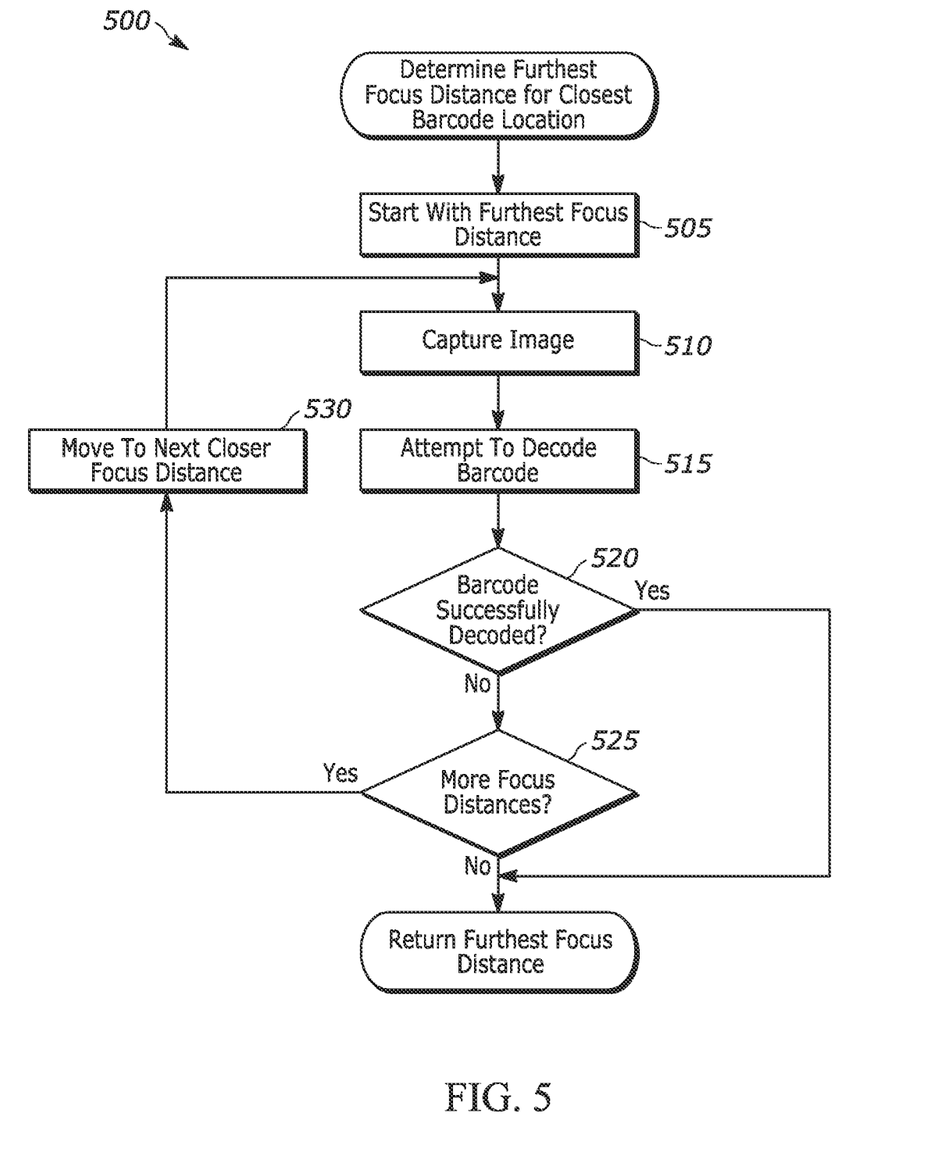
FIG. 5 is a flowchart representative of an example method, hardware logic, machine-readable instructions, or software for determining a furthest focus position at which a barcode at a closest limit can be decoded, in accordance with embodiments of the disclosure.

FIG. 5 is a flowchart 500 representative of an example process or method that may be implemented or carried out by the processor(s) 155 and/or, more generally, the barcode scanner 100 of FIG. 1 to determine a furthest focus distance at which a barcode of an anticipated maximum barcode density at a closest limit of a decode range can be successfully imaged and decoded. Any or all of the blocks of FIG. 5 may be an executable program or portion(s) of an executable program embodied in software and/or machine-readable instructions stored on a non-transitory, machine-readable storage medium for execution by one or more processors, such as the processor(s) 155. Additionally and/or alternatively, any or all of the blocks of FIG. 5 may be implemented by one or more hardware circuits structured to perform the corresponding operation(s) without executing software or instructions.

The flowchart 500 of FIG. 5 begins at block 505 with the processor(s) 155 controlling the focus components 140 to focus the imaging device 115 at its furthest focus distance (e.g., the focus distance F5). The processor(s) 155 control the image sensor(s) 125 to capture image data representing a first image 120 (block 510), and control the barcode decoder 150 to attempt to decode a barcode from the image data (block 515). If one or more barcodes are successfully decoded (block 520), control exits from the example flowchart 500, returning this focus distance as the furthest focus distance of the subset.

If a barcode is not successfully decoded (block 520), and if there are more focus distances to try (block 525), control proceeds to block 530 where the processor(s) 155 control the focus components 140 to focus the imaging device 115 at the next closer focus distance (e.g., the focus distance F4) (block 530), and control returns to block 510 to capture image data representing another image 120.

If there are no more focus distances to try (block 525), control exits from the example flowchart 500.

Figure 6:
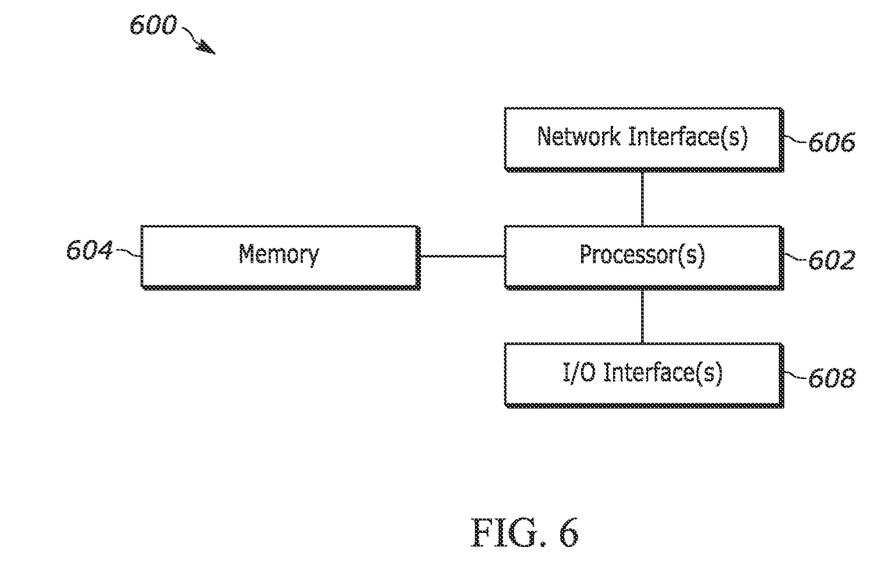
FIG. 6 is a block diagram of an example logic circuit for implementing example methods and/or operations described herein.

FIG. 6 is a block diagram representative of an example logic circuit capable of implementing, for example, one or more components of the example barcode scanner 100 of FIG. 1 for imaging and decoding barcodes appearing in a FOV 105 of the barcode scanner 100. The example logic circuit of FIG. 6 is a processing platform 600 capable of executing instructions to, for example, implement operations of the example methods described herein, as may be represented by the flowcharts of the drawings that accompany this description. Other example logic circuits capable of, for example, implementing operations of the example methods described herein include field programmable gate arrays (FPGAs) and application specific integrated circuits (ASICs).

The example processing platform 600 of FIG. 6 includes one or more processors 602 such as, for example, one or more microprocessors, controllers, and/or any suitable type of processor. The example processing platform 600 of FIG. 6 includes memory (e.g., volatile memory, non-volatile memory) 604 accessible by the processor(s) 602 (e.g., via a memory controller, not shown for clarity of illustration). The example processor(s) 602 interact with the memory 604 to obtain, for example, machine-readable instructions stored in the memory 604 corresponding to, for example, the operations represented by the flowcharts of this disclosure. Additionally or alternatively, machine-readable instructions corresponding to the example operations described herein may be stored on one or more removable media (e.g., a compact disc (CD), a digital versatile disc (DVD), removable flash memory, etc.) that may be coupled to the processing platform 600 to provide access to the machine-readable instructions stored thereon.

The processing platform 600 of FIG. 6 includes one or more communication interfaces such as, for example, one or more network interfaces 606, and/or one or more input/output (I/O) interfaces 608 that can be used to implement the communication interface(s) 160 of FIG. 1. The communication interface(s) enable the processing platform 600 of FIG. 6 to communicate with, for example, another device, system, host, etc. (e.g., a POS system, a point-of-transaction system, an inventory management system), datastore, database, and/or any other machine, such as the host 110 of FIG. 1.

The example processing platform 600 of FIG. 6 also includes the network interface(s) 606 to enable communication with other machines via, for example, one or more networks. The example network interface 606 includes any suitable type of communication interface(s) (e.g., wired and/or wireless interfaces) configured to operate in accordance with any suitable protocol(s).

The example, processing platform 600 of FIG. 6 also includes the input/output (I/O) interface(s) 608 to, for example, implement the example user interface(s) 165 of FIG. 1 to enable receipt of user input and communication of output data to the user.

The above description refers to a block diagram of the accompanying drawings. Alternative implementations of the example represented by the block diagram includes one or more additional or alternative elements, processes, and/or devices. Additionally or alternatively, one or more of the example blocks of the diagram may be combined, divided, re-arranged, or omitted. Components represented by the blocks of the diagram are implemented by hardware, software, firmware, and/or any combination of hardware, software, and/or firmware. In some examples, at least one of the components represented by the blocks is implemented by a logic circuit. As used herein, the term "logic circuit" is expressly defined as a physical device including at least one hardware component configured (e.g., via operation in accordance with a predetermined configuration and/or via execution of stored machine-readable instructions) to control one or more machines and/or perform operations of one or more machines. Examples of a logic circuit include one or more processors, one or more coprocessors, one or more microprocessors, one or more controllers, one or more digital signal processors (DSPs), one or more application specific integrated circuits (ASICs), one or more field programmable gate arrays (FPGAs), one or more microcontroller units (MCUs), one or more hardware accelerators, one or more special-purpose computer chips, and one or more system-on-a-chip (SoC) devices. Some example logic circuits, such as ASICs or FPGAs, are specifically configured hardware for performing operations (e.g., one or more of the operations described herein and represented by the flowcharts of this disclosure, if such are present). Some example logic circuits are hardware that executes machine-readable instructions to perform operations (e.g., one or more of the operations described herein and represented by the flowcharts of this disclosure, if such are present). Some example logic circuits include a combination of specifically configured hardware and hardware that executes machine-readable instructions. The above description refers to various operations described herein and flowcharts that may be appended hereto to illustrate the flow of those operations. Any such flowcharts are representative of example methods disclosed herein. In some examples, the methods represented by the flowcharts implement the apparatus represented by the block diagrams. Alternative implementations of example methods disclosed herein may include additional or alternative operations. Further, operations of alternative implementations of the methods disclosed herein may combined, divided, re-arranged, or omitted. In some examples, the operations described herein are implemented by machine-readable instructions (e.g., software and/or firmware) stored on a medium (e.g., a tangible machine-readable medium) for execution by one or more logic circuits (e.g., processor(s)). In some examples, the operations described herein are implemented by one or more configurations of one or more specifically designed logic circuits (e.g., ASIC(s)). In some examples the operations described herein are implemented by a combination of specifically designed logic circuit(s) and machine-readable instructions stored on a medium (e.g., a tangible machine-readable medium) for execution by logic circuit(s).

As used herein, each of the terms "tangible machine-readable medium," "non-transitory machine-readable medium" and "machine-readable storage device" is expressly defined as a storage medium (e.g., a platter of a hard disk drive, a digital versatile disc, a compact disc, flash memory, read-only memory, random-access memory, etc.) on which machine-readable instructions (e.g., program code in the form of, for example, software and/or firmware) are stored for any suitable duration of time (e.g., permanently, for an extended period of time (e.g., while a program associated with the machine-readable instructions is executing), and/or a short period of time (e.g., while the machine-readable instructions are cached and/or during a buffering process)). Further, as used herein, each of the terms "tangible machine-readable medium," "non-transitory machine-readable medium" and "machine-readable storage device" is expressly defined to exclude propagating signals. That is, as used in any claim of this patent, none of the terms "tangible machine-readable medium," "non-transitory machine-readable medium," and "machine-readable storage device" can be read to be implemented by a propagating signal.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings. Additionally, the described embodiments/examples/implementations should not be interpreted as mutually exclusive, and should instead be understood as potentially combinable if such combinations are permissive in any way. In other words, any feature disclosed in any of the aforementioned embodiments/examples/implementations may be included in any of the other aforementioned embodiments/examples/implementations.

The benefits, advantages, solutions to problems, and any element(s) that may cause any benefit, advantage, or solution to occur or become more pronounced are not to be construed as a critical, required, or essential features or elements of any or all the claims. The claimed invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 50%, in another embodiment within 6%, in another embodiment within 5% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

Use of "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise. A device or structure that is "configured" in a certain way is configured in at least that way, but may also be configured in ways that are not listed. Further still, unless expressly stated to the contrary, "or" refers to an inclusive or and not to an exclusive or. For example, "A, B or C" refers to any combination or subset of A, B, C such as (1) A alone, (2) B alone, (3) C alone, (4) A with B, (5) A with C, (6) B with C, and (7) A with B and with C. As used herein, the phrase "at least one of A and B" is intended to refer to any combination or subset of A and B such as (1) at least one A, (2) at least one B, and (3) at least one A and at least one B. Similarly, the phrase "at least one of A or B" is intended to refer to any combination or subset of A and B such as (1) at least one A, (2) at least one B, and (3) at least one A and at least one B.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter may lie in less than all features of a single disclosed embodiment. Thus, the following claims are hereby incorporated into the Detailed Description, with each claim standing on its own as a separately claimed subject matter.

The invention claimed is:

1. A method of configuring a reduced decode range for a barcode scanner having a plurality of discrete focus distances, the method comprising:
   determining a closest focus distance of the plurality of focus distances at which a barcode placed at a furthest limit of the reduced decode range can be successfully decoded;
   determining a furthest focus distance of the plurality of focus distances at which the barcode placed at a closest limit of the reduced decode range can be successfully decoded;
   determining a subset of the plurality of focus distances that consists of the closest focus distance, the furthest focus distance, and focus distances between the closest focus distance and the farthest focus distance; and
   configuring the barcode scanner to only use the subset of focus distances during subsequent attempts to decode barcodes.

2. The method of claim 1, wherein determining the closest focus distance includes:
   prompting a person to place a calibration barcode at the furthest limit, wherein the calibration barcode represents a densest barcode that the barcode scanner is intended to decode at the furthest limit;
   setting a current focus distance of the barcode scanner to a closest of the plurality of focus distances; and
   for each of the plurality of focus distances until the calibration barcode is successfully decoded:
      focusing the barcode scanner at the current focus distance;
      capturing, using an image sensor of the barcode scanner, image data representing an image of an environment that includes the calibration barcode while the optical assembly is focused at the current focus distance;
      attempting to decode, using a barcode decoder, the calibration barcode from the image data;
      when the calibration barcode is not successfully decoded, setting the current focus distance to the next further focus distance; and
      when the calibration barcode is successfully decoded, setting the closest focus distance to the current focus distance.

3. The method of claim 2, wherein determining the furthest focus distance includes:
   prompting a person to place the calibration barcode at the closest limit;
   setting a current focus distance of the barcode scanner to a furthest of the plurality of focus distances; and
   for each of the plurality of focus distances until the calibration barcode is successfully decoded:
      focusing the barcode scanner at the current focus distance;
      capturing, using an image sensor of the barcode scanner, image data representing an image of an environment that includes the calibration barcode while the optical assembly is focused at the current focus distance;
      attempting to decode, using a barcode decoder, the calibration barcode from the image data;
      when the calibration barcode is not successfully decoded, setting the current focus distance to the next closer focus distance; and
      when the calibration barcode is successfully decoded, setting the furthest focus distance to the current focus distance.

4. The method of claim 1, wherein determining the closest focus distance includes:
   determining a second subset of the focus distances at which the barcode, when placed at the furthest limit, can be successfully decoded; and
   determining the closest focus distance to be the focus distance of the second subset of focus distances that is closest to the barcode scanner.

5. The method of claim 4, wherein determining the furthest focus distance includes:
   determining a third subset of the plurality of focus distances at which the barcode, when placed at the closest limit, can be successfully decoded; and
   determining the furthest focus distance to be the focus distance of the third subset of focus distances that is furthest from the barcode scanner.

6. The method of claim 4, wherein determining the second subset of focus distances includes:
   prompting a person to place a calibration barcode at the furthest limit, wherein the calibration barcode represents a densest barcode that the barcode scanner is intended to decode at the furthest limit; and
   for each of the plurality of focus distances:
      focusing an optical assembly of the barcode scanner at the focus distance;
      capturing, using an image sensor of the barcode scanner, image data representing an image of an environment that includes the calibration barcode while the optical assembly is focused at the focus distance;
      attempting to decode, using a barcode decoder, the calibration barcode from the image data; and
      when the calibration barcode is successfully decoded, adding the focus distance to the second subset of focus distances.

7. The method of claim 1, wherein determining the subset of focus distances includes determining a smallest subset of the plurality of focus distances that enables the barcode scanner to successfully decode barcodes having an anticipated density and located between the furthest limit and the closest limit.

8. The method of claim 1, further comprising, for each of the subset of focus distances until a barcode is successfully decoded:
   capturing, using an image sensor of the barcode scanner, image data representing an image of an environment of the barcode scanner;
   attempting, using a barcode decoder, to decode a barcode from the image data; and
   when a barcode is successfully decoded:
      stop attempting to decode a barcode;
      determining a payload of the decoded barcode; and
      providing the payload to a computing system.

9. A barcode scanner, comprising:
one or more processors; and
non-transitory computer-readable storage storing instructions that, when executed by the one or more processors, causes the barcode scanner to:
   determine a closest focus distance of a plurality of discrete focus distances of the barcode scanner at which a barcode placed at a furthest limit from the barcode scanner can be successfully decoded;
   determine a furthest focus distance of the plurality of focus distances at which the barcode placed at a closest limit from the barcode scanner can be successfully decoded;
   determine a subset of the plurality of focus distances that consists of the closest focus distance, the furthest focus distance, and focus distances between the closest focus distance and the furthest focus distance; and
   configure the barcode scanner to only use the subset of focus distances during subsequent attempts to decode barcodes.

10. The barcode scanner of claim 9, wherein the instructions, when executed by the one or more processors, cause the system to determine the closest focus distance by:
   prompting a person to place a calibration barcode at the furthest limit, wherein the calibration barcode represents a densest barcode that the barcode scanner is intended to decode at the furthest limit;
   setting a current focus distance of the barcode scanner to a closest of the plurality of focus distances; and
   for each of the plurality of focus distances until the calibration barcode is successfully decoded:
      focusing the barcode scanner at the current focus distance;
      capturing, using an image sensor of the barcode scanner, image data representing an image of an environment that includes the calibration barcode while the optical assembly is focused at the current focus distance;
      attempting to decode, using a barcode decoder, the calibration barcode from the image data;
      when the calibration barcode is not successfully decoded, setting the current focus distance to the next further focus distance; and
      when the calibration barcode is successfully decoded, setting the closest focus distance to the current focus distance.

11. The barcode scanner of claim 10, wherein the instructions, when executed by the one or more processors, cause the system to determine the furthest focus distance by:
   prompting a person to place a calibration barcode at the closest limit;
   setting a current focus distance of the barcode scanner to a furthest of the plurality of focus distances; and
   for each of the plurality of focus distances until the calibration barcode is successfully decoded:
      focusing the barcode scanner at the current focus distance;
      capturing, using an image sensor of the barcode scanner, image data representing an image of an environment that includes the calibration barcode while the optical assembly is focused at the current focus distance;
      attempting to decode, using a barcode decoder, the calibration barcode from the image data;
      when the calibration barcode is not successfully decoded, setting the current focus distance to the next closer focus distance; and
      when the calibration barcode is successfully decoded, setting the furthest focus distance to the current focus distance.

12. The barcode scanner of claim 9, wherein the instructions, when executed by the one or more processors, cause the system to determine the closest focus distance by:
   determining a second subset of the plurality of focus distances at which the barcode, when placed at the first distance from the barcode scanner, can be successfully decoded; and
   determining the closest focus distance to be the focus distance of the second subset of focus distances that is closest to the barcode scanner.

13. The barcode scanner of claim 12, wherein the instructions, when executed by the one or more processors, cause the system to determine the furthest focus distance by:
   determining a third subset of the plurality of focus distances at which the barcode, when placed at the second distance from the barcode scanner, can be successfully decoded; and
   determining the furthest focus distance to be the focus distance of the third subset of focus distances that is furthest from the barcode scanner.

14. The barcode scanner of claim 12, further comprising:
an image sensor;
an optical assembly; and
a barcode decoder,
wherein the instructions, when executed by the one or more processors, cause the system to determine the second subset of focus distances by:
   directing a person to place a calibration barcode at the first distance, wherein the calibration barcode represents a densest barcode that the barcode is intended to decode at the first position; and
   for each of the plurality of focus distances:
      focusing the optical assembly of the barcode scanner at the focus distance;
      capturing, using the image sensor, image data representing an image of an environment including the calibration barcode while the optical assembly is focused at the focus distance;
      attempting to decode, using the barcode decoder, the calibration barcode from the image data; and
      when the calibration barcode is successfully decoded, adding the focus distance to the second subset of focus distances.

15. The barcode scanner of claim 9, wherein the instructions, when executed by the one or more processors, cause the system to determine the subset of focus distances by determining a smallest subset of the plurality of focus distances that enables the barcode scanner to successfully decode barcodes having an anticipated density and located between the closest limit and the furthest limit.

16. The barcode scanner of claim 9, further comprising:
an image sensor;
an optical assembly; and
a barcode decoder,
wherein the instructions, when executed by the one or more processors, cause the system to, for each of the subset of focus distances until a barcode is successfully decoded:
   capture, using the image sensor, image data representing an image of an environment of the barcode scanner;

attempt, using the barcode decoder, to decode a barcode from the image data; and when a barcode is successfully decoded:
stop attempting to decode a barcode;
determining a payload of the decoded barcode; and
providing the payload to a computing system.

17. A non-transitory, computer-readable storage media storing instructions that, when executed by one or more processors, cause a barcode scanner to:

determine a closest focus distance of a plurality of discrete focus distances of the barcode scanner at which a barcode placed at a furthest limit from the barcode scanner can be successfully decoded;

determine a furthest focus distance of the plurality of focus distances at which the barcode placed at a closest limit from the barcode scanner can be successfully decoded;

determine a subset of the plurality of focus distances that consists of the closest focus distance, the furthest focus distance, and focus distances between the closest focus distance and the furthest focus distance; and configure the barcode scanner to only use the subset of focus distances during subsequent attempts to decode barcodes.

18. The non-transitory, computer-readable storage media of claim 17, wherein the instructions, when executed by the one or more processors, cause the barcode scanner to determine the closest focus distance by:

prompting a person to place a calibration barcode at the furthest limit, wherein the calibration barcode represents a densest barcode that the barcode scanner is intended to decode at the furthest limit;

setting a current focus distance of the barcode scanner to a closest of the plurality of focus distances; and for each of the plurality of focus distances until the calibration barcode is successfully decoded:
focusing the barcode scanner at the current focus distance;
capturing, using an image sensor of the barcode scanner, image data representing an image of an environment that includes the calibration barcode while the optical assembly is focused at the current focus distance;
attempting to decode, using a barcode decoder, the calibration barcode from the image data;
when the calibration barcode is not successfully decoded, setting the current focus distance to the next further focus distance; and
when the calibration barcode is successfully decoded, setting the closest focus distance to the current focus distance.

19. The non-transitory, computer-readable storage media of claim 18, wherein the instructions, when executed by the one or more processors, cause the barcode scanner to determine the furthest focus distance by:

prompting a person to place a calibration barcode at the closest limit;

setting a current focus distance of the barcode scanner to a furthest of the plurality of focus distances; and for each of the plurality of focus distances until the calibration barcode is successfully decoded:
focusing the barcode scanner at the current focus distance;
capturing, using an image sensor of the barcode scanner, image data representing an image of an environment that includes the calibration barcode while the optical assembly is focused at the current focus distance;
attempting to decode, using a barcode decoder, the calibration barcode from the image data;
when the calibration barcode is not successfully decoded, setting the current focus distance to the next closer focus distance; and
when the calibration barcode is successfully decoded, setting the furthest focus distance to the current focus distance.

20. The non-transitory, computer-readable storage media of claim 17, wherein the instructions, when executed by the one or more processors, cause the barcode scanner to, for each of the subset of focus distances until a barcode is successfully decoded:

capturing, using an image sensor of the barcode scanner, image data representing an image of an environment of the barcode scanner;

attempting, using a barcode decoder, to decode a barcode from the image data; and when a barcode is successfully decoded:
stop attempting to decode a barcode;
determining a payload of the decoded barcode; and
providing the payload to a computing system.

* * * * *